Figure 1:
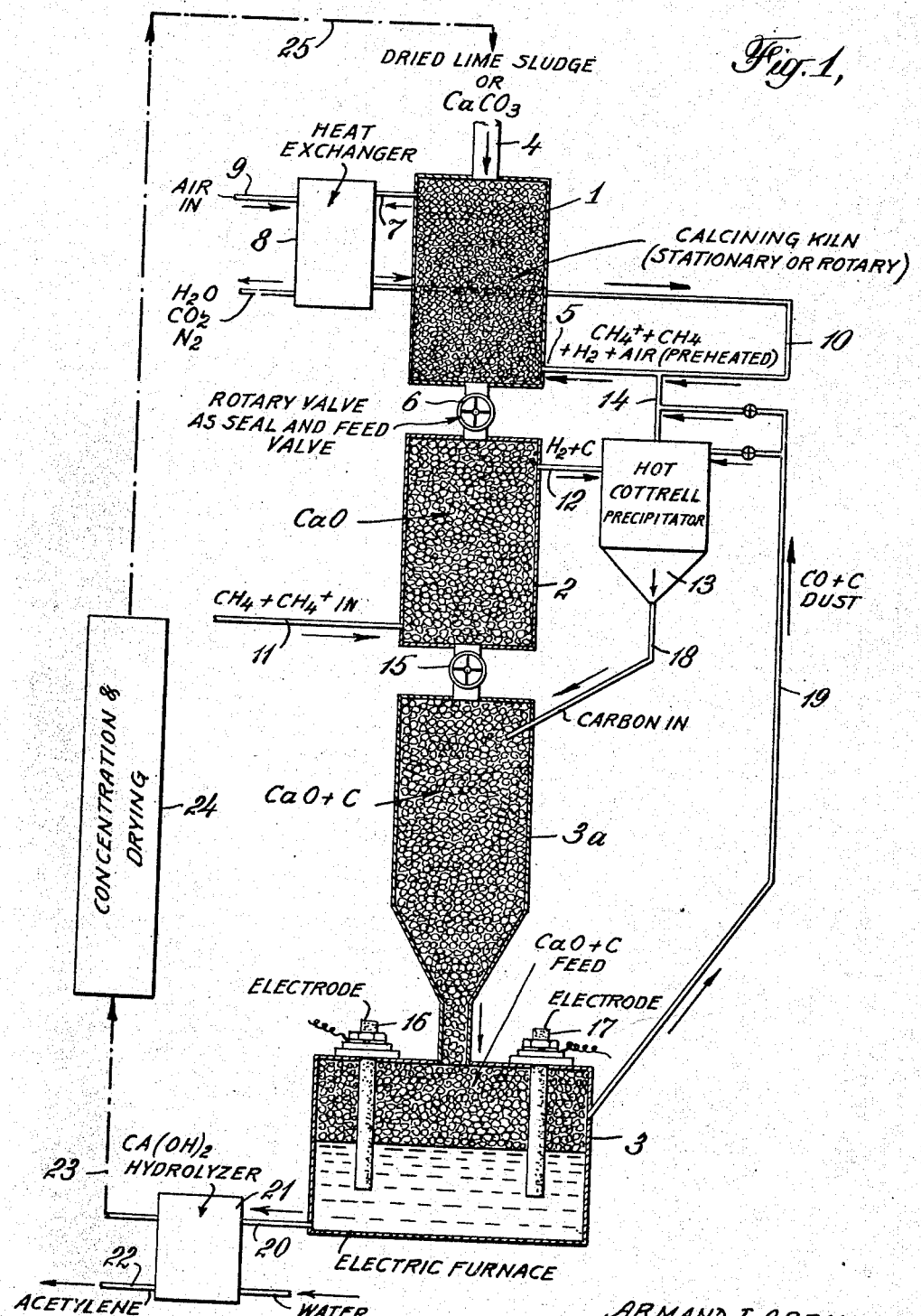

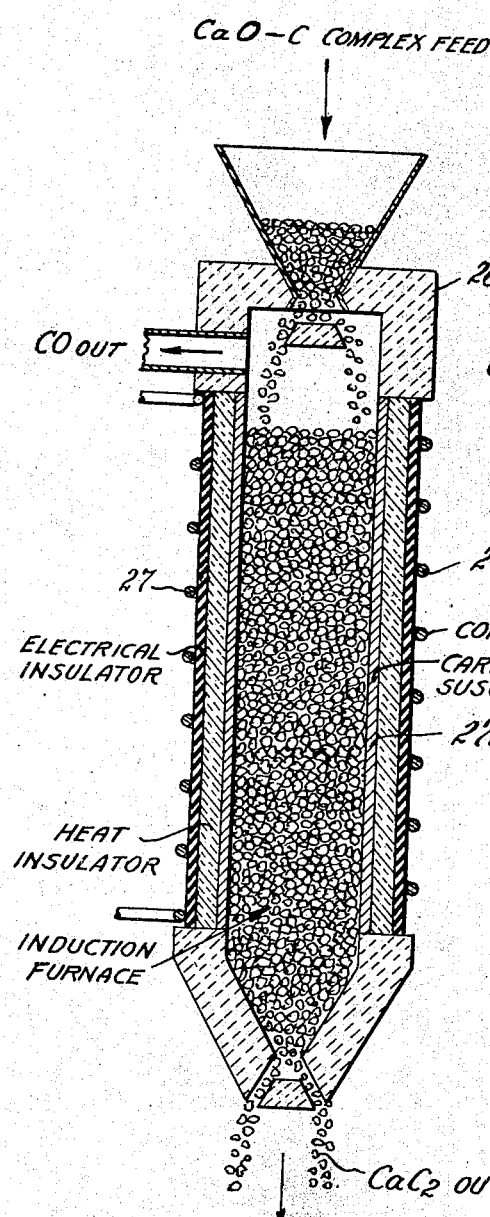
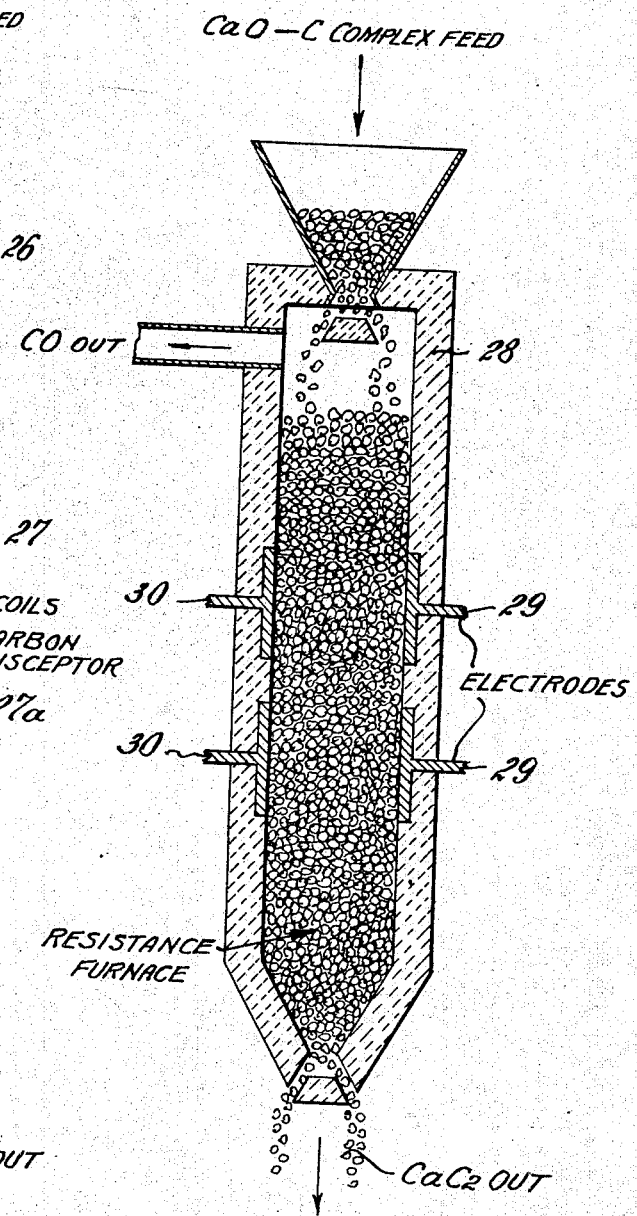

UNITED STATES PATENT OFFICE 2,380,008

PROCESS FOR IMPREGNATION OF LIME WITH CARBON

Armand J. Abrams and Louis B. Cook, Dallas, Tex., assignors to Socony-Vacuum Oil Company, Incorporated, New York, N. Y., a corporation of New York Application November 15, 1941, Serial No. 419,238

16 Claims. (Cl. 23—208)

This invention is concerned with a method for the utilization of hydrocarbon gases and especially hydrocarbon gases which are predominantly methane, such as, for example, natural gas. The invention relates particularly to the use of such gases in the production of calcium carbide.

Enormous quantities of gases containing a high percentage of methane are readily available, and for this reason, considerable thought and work has been expended in an endeavor to find some use for such gases other than merely as a fuel. For the most part, however, because of the stability of the methane, a use for these gases has remained a complicated problem so that where they are produced, they are either recycled into the ground, used as fuel or flared off. The present invention has developed a novel process for utilizing methane-containing gases as a source of carbon in the manufacture of useful lime-carbon complexes as well as calcium carbide. Moreover, these lime-carbon complexes in certain forms are believed to be novel products as also is one form of the calcium carbide that can be produced.

The primary use of calcium carbide is for the production of acetylene by hydrolysis. Heretofore, calcium carbide has been manufactured commercially by fusing a mixture of lime and coke. However, certain limiting and inconvenient factors are inherent in this method, chiefly surrounding the necessity of so locating the carbide plant as to insure ready access to cheap and abundant supplies of three different essentials, namely, limestone, coke and power.

Accordingly, another important consideration underlying the present invention is the fact that a process is furnished to the art for the manufacture of calcium carbide whose essentials, namely, limestone, light hydrocarbon gases and power, are closely associated in cheap and abundant quantities, such as, for example, in the south-western part of the United States.

Therefore, it is an object of our invention to provide an attractive process for the utilization of light hydrocarbon gases.

Another object is to provide a method of manufacturing useful lime-carbon complexes, some of which are believed novel.

A more specific object is to furnish an efficient process for the manufacture of calcium carbide, using methane-containing gases as the source of carbon.

A still more specific, but highly important, object is to manufacture calcium carbide directly in a solid state from solid lime rather than in a fused state.

A further object is to produce calcium carbide from lime and carbon at substantially lower temperatures than used heretofore.

Still another object is to provide a process for the manufacture of calcium carbide and lime-carbon complexes that uses materials and power requirements which are cheap, abundant and closely associated as to source.

All the above objects, as well as other objects, will be apparent from the following description of our invention.

For the manufacture of calcium carbide, our process involves two distinct and separate steps. These two separate steps are (1) the pyrolysis of a light hydrocarbon gas in the presence of lime or limestone under what might be termed relatively moderate temperatures so as to form a lime-carbon complex or mixture which contains calcium and carbon in suitable ratios for the manufacture of calcium carbide, and (2) treatment of such lime-carbon complex or mixture in a separate step at substantially higher temperatures to form calcium carbide therefrom. Furthermore, each of these two steps, when carried out in our preferred manner, is believed to be new and novel by itself as well as the product yielded thereby.

Although possibly most normally gaseous hydrocarbons might be used in the process, the rather high temperatures required for the pyrolysis of the very light hydrocarbons are thought to be of considerable importance in attaining the desired type of carbon formation with the lime in the lime-carbon complex. Moreover, other constructive uses have been found for most of the higher normally gaseous hydrocarbons. Therefore, for these reasons and also because there are such tremendous supplies of light hydrocarbon gases, we are concerned primarily with the use of methane-predominating gases, i. e., gases in which methane is the predominant hydrocarbon.

The limestone used should be in the form of granules or small lumps of such size as to give a fairly free flowing mass. A size of from about $\frac{1}{4}$ to about 2 inches has been found especially suitable as presenting a convenient balance of volume and exposed surface with proper resistance to gas passage through a mass thereof. These sizes are, of course, not critical and may be varied. We shall use the term "crushed limestone" or "crushed lime" to indicate generally that small lumps of suitable particle size are being used.

The degree of pyrolysis of the natural gas or methane-predominating gas in the pyrolysis step is controlled to give a deposit of carbon on, in, or with the lime of proportions suitable for subsequent carbide formation. The theoretical mol ratio is, of course, one of calcium oxide (lime) to three of carbon. However, as known, this ratio may be varied somewhat in practice, as for example, from one CaO to 2.5 to 3.5 carbon. It has been found that it is relatively easy to attain ratios within this range by the present invention at reasonable space velocities (vol. of hydrocarbon gas/vol. CaO/min.) even though natural gas does appear to be a refractory and rather inefficient source of carbon for chemical synthesis as compared to, say, coal or coke or liquid hydrocarbons.

It will be understood that the amount of carbon deposition is somewhat dependent on space velocity; that is, other factors remaining constant, lower space velocities should be used with lower temperatures. By way of illustration, it may be stated that for our preferred temperature range of 850–1150° C., a gas space velocity between about 6 and about 90 will be found satisfactory.

The pyrolyzing temperatures should be sufficient to give a practical rate of carbon deposition but substantially below recognized carbide-forming temperatures, as, for example, between about 850 and about 1400° C. The range of about 850° C. (1562° F.) to about 1150° C. (2102° F.) is preferred because in this range the carbon formed is unique and produces a novel complex with the lime. The range of 950 to 1050° C. is considered optimum for our pyrolyzing step.

Thus, in our preferred temperature range the methane decomposes to produce a novel complex or mixture with the lime. That is, the structure and constitution of this complex is not fully understood, but it is quite evident that it is different from lime, from calcium carbide, and from a simple lime-carbon mechanical mixture. In fact, our complex closely resembles a good grade metallurgical coke in glossy luster, resistance to abrasion, crushing and shearing strength, whereas lime, as is well known, crushes very easily. Further, our complex is quite resistant to weathering, whereas lime is hydrated rapidly when left exposed. The same features also obviously distinguish our complex from simple lime-carbon mixtures since the lime would retain its characteristics in such a mixture. Our novel complex in its preferred form is characterized further by having a substantially uniform dark color throughout the particle. That is, by our process we are able to produce a lime-carbon complex of various mol ratios, even in such low ratios of carbon to lime that the carbon is not uniformly distributed through the entire particle. However, in the preferred form of higher mol ratios, e. g., one to one or higher, the carbon is uniformly distributed. Still further, because of the unique carbon characteristics of our complex, the complex is an electrical conductor even where it has a very small ratio of carbon to lime, and where this mol ratio is at least one to one, the complex is a suitable electrical conductor at industrially common voltages. On the other hand, our complex is easily distinguished from calcium carbide, as, for example, by its inability to be hydrolyzed to form acetylene.

We believe that one of the principal reasons we are able to obtain such a unique lime-carbon complex, wherein the carbon is so intimately and thoroughly associated with the lime, is because in the pyrolysis chamber the methane or hydrocarbon gas is distributed throughout the pores or interstices of the lime particles, and, as a result, the methane decomposes to carbon in intimate association with each lime particle and throughout the entire lump. Moreover, this methane decomposition is occurring at a very high temperature. Our views on this point are confirmed by our experimental work. This work indicates that if we are to obtain our novel complex at all, and also if we are to obtain any lime-carbon mixture suitable for carbide manufacture within a commercially feasible time, the pyrolysis of the hydrocarbon gas in the presence of the lime should be carried out in the absence of large amounts of gases other than such hydrocarbon gases and the decomposition products thereof. Thus, judging from the experience of our several years of work on this problem, it appears that where, for example, combustion gases or other heating gases which oxidize carbon are introduced into the pyrolysis chamber in considerable quantity, competing reactions for carbon set in which tend to inhibit deposition of carbon in appreciable amounts, so that our novel complex is not produced and rather long reaction times are required in order to obtain substantial carbon deposits.

Therefore, for our preferred procedure, we have devised several methods of heating the pyrolysis chamber, in addition to the obvious manners for doing same, which do not require introduction of combustion-gases thereinto. Methods of heating through a confining wall, such as by combustion-gases, electrical resistance heaters, etc., could be used. Moreover, the electrical resistance heaters might be placed in direct contact with the lime particles. A rather unique method of heating the pyrolysis chamber, however, is afforded because of the fact our process is capable of producing a lime-carbon complex which is an electrical conductor. That is, by recycling a sufficient amount of this complex to the pyrolysis chamber so that the entire charge in the chamber may be used as a resistor, such as, for example, when this complex constitutes about 90% of the solids, the heating may be supplied by electrical resistance. Other methods of heating might involve carrying on simultaneously in the pyrolysis chamber an essentially exothermic reaction or reactions which permit appreciably lower temperatures to be used than are required in a strictly thermal operation. In view of the high temperatures involved in the pyrolysis of methane, such considerations are material.

The fact that the off gases from our preferred pyrolysis chamber are not contaminated with large quantities of combustion-gases, creates a further important ramification of our process, namely, the utilization of these off gases. Such gases consist of hydrogen, carbon dioxide and some unreacted methane (or other hydrocarbon gases) when limestone is used, and when lime is used directly, rather than forming it from limestone, these gases consist only of hydrogen and methane (or other hydrocarbon gases). The percentage of hydrogen in these gases is relatively high under conditions of low space velocity operation so that its recovery is worthwhile, and, indeed, the process may be looked upon as an efficient method of manufacturing hydrogen. Still further, these off gases are a suitable charge for an arc furnace for the manufacture of acetylene directly and this may be done, if desired.

Our novel lime-carbon complex is a commercially important product which has uses other than for the manufacture of calcium carbide, in fact, it is a most efficient material for uses in general requiring the presence of lime and carbon. Thus, for example, our complex is eminently suitable for use in blast furnaces for ore reduction, and other specific uses will be obvious in processes where there is a simultaneous requirement for lime and carbon. The unique characteristics of our complex are all in its favor for such uses. For instance, it is a hard material which will stand considerable handling and shipping without crushing; it weathers very slowly; and the carbon is firmly secured to the lime, and also is uniformly distributed therethrough, so that it is a non-dusting product. Moreover, loose soot is not present to be handled or to present problems of retaining same in a furnace having a strong draft. Still further, the complex is an electrical conductor so that electrical resistance furnaces may be employed where it is used.

As noted above, we are especially concerned in this invention with the use of our complex for the manufacture of calcium carbide. Many of the above and other advantages of our complex will be seen in this operation. According to our process, lime with the proper amount of carbon which has been produced by pyrolysis of light hydrocarbon gases is passed into an electric furnace where the mixture is heated for the production of calcium carbide ($CaC_2$) at a substantially higher temperature than is used in the pyrolysis chamber. For example, whereas the pyrolysis temperature should be around 850 to 1150° C., the carbide-forming temperature should be above about 1700° C., the preferred carbide-forming temperatures being between about 1800 and about 2350° C. Therefore, it can be seen that two distinct and separate steps are involved in order to obtain a product containing substantial amounts of calcium carbide. Our efforts to accomplish in one step the methane pyrolysis and the carbide-forming operation have been entirely unsatisfactory for obtaining appreciable or, in fact, easily detectable amounts of calcium carbide.

The carbon and lime of our process may be heated to carbide-forming temperatures by the same means conventional lime and coke mixtures are heated to yield calcium carbide, as, for example, by an electric arc-type or an electric resistance-type furnace. In addition, an electric inductance-type furnace might be used because the lime and carbon of our complex are so intimately associated that the lime will not react with the carbon susceptor of the furnace.

As is well known, calcium carbide has been produced heretofore in a fused state. Present commercial installations attain continuous production by tapping off the molten product and feeding in fresh charges of solid lime and coke. Our process also may be operated in this conventional manner. However, there are several inherent disadvantages and inconveniences connected with operating under tapping conditions.

Therefore, another far-reaching and important advantage is obtained by using our novel lime-carbon complex as a charge material for the carbide furnace. We have made the surprising discovery that by using this charge material, calcium carbide can be produced directly in the solid state in the form of lumps, e. g., ¼ to 2 inches in size, which contain a predominant amount of $CaC_2$. In fact, lumps may be made containing almost any amount of $CaC_2$, such as, from about 5% to 90 or 95%. For practical products, however, the content of $CaC_2$ should be at least 20 or 25% and preferably above about 50 to 65%. We have found that with this material a carbide-forming temperature can be used which is substantially, e. g., 300 to 400° C., below the conventional carbide-forming temperatures for lime and coke charges. Because of this fact, we are able to operate at temperatures which are below the melting points of the charge and calcium carbide, and, as a result, the calcium carbide is formed directly in the same solid or lump form that the lime-carbon complex is in. Workers acquainted with carbide furnaces or other like high temperature furnaces will readily appreciate the economies which will result when such furnaces are operated under non-tapping conditions.

Furthermore, aside from the advantages connected with getting our solid calcium carbide out of the furnace as compared to tapping molten $CaC_2$ and also the fact our $CaC_2$ is produced in lump form, there is still another advantage in that this preferred calcium carbide of ours is believed to have a different physical structure. That is, lumps of our product which do not pass through a molten state appear to be more pervious than prior calcium carbide even though the two products may have the same $CaC_2$ content, e. g., 65 to 85%. Therefore, our highly pervious product of high $CaC_2$ content can be used more efficiently or effectively in certain processes, as, for instance, in certain chemical syntheses, such as in treating with nitrogen to produce calcium cyanamide. At best, the calcium carbide which has been fused and solidified would have to be crushed.

We are not entirely clear as to just why our lime-carbon complex affords the above advantage. However, we feel it is primarily due to the carbon being so intimately and uniformly associated or mixed with the lime so that formation of $CaC_2$ can take place in the solid state, whereas in prior processes it is necessary to fuse the charge in order to obtain the necessary mixing or association of lime and carbon for forming the carbide. Hence, it seems we retain at least the porous structure of the lime lumps and possibly we increase the porosity of the lumps by the carbon monoxide gas liberated during the formation of the $CaC_2$. Such a result, of course, cannot be obtained where the $CaC_2$ is formed in a fused state.

Accordingly, a complete acetylene-producing operation embodying our invention might employ all of the following steps: (1) calcining limestone to lime, (2) pyrolyzing a methane-predominating gas in the presence of lime to form our lime-carbon complex, (3) conversion of the lime-carbon complex to calcium carbide, (4) hydrolysis of the calcium carbide to acetylene and calcium hydroxide, and (5) concentrating and calcining the calcium hydrate and returning the calcium oxide produced thereby to the system. On the other hand, at places where adequate supplies of cheap lime are available, step (1) would probably be eliminated. Also where the point of use of acetylene is remote from the carbide plant, as is very usual, the hydration step (4) might be conducted near that point, and then step (5) would be abandoned for obvious reasons.

In order to explain the invention still more, reference is now made to the accompanying drawings which show in diagrammatic form, suitable apparatus systems for carrying out the invention. In these drawings, Fig. 1 shows a complete acetylene-producing system while Figures 2 and 3 show two different types of carbide furnaces, in each of which, however, the calcium carbide is produced in a solid state.

Referring now to Figure 1, there is shown a calcining kiln of usual type, a gas pyrolysis kiln 2, and a carbide furnace 3, all arranged for continuous operation. Limestone or dried lime sludge may be fed to calcining furnace 1, through a feed device located at 4, and in furnace 1, it will meet a combustion mixture introduced at 5 and be converted to calcium oxide. The calcium oxide or lime passes on in heated condition to furnace 2 through passage 6. Hot gases from the calcining furnace, departing through pipe 7, pass through a heat exchanger 8, where they give up heat to air introduced through pipe 9 which air, when heated, passes through pipe 10 to enter the calcining furnace 1. This calcining furnace 1, will have the usual characteristics of design and operation plus suitable modifications for the fuel used, and will operate at the usual temperatures of, say, 850–1150° C. It perhaps should be noted that dead burned lime is not objectional in this process.

Hot calcium oxide passes in a heated condition through passage 6 into and fills the hydrocarbon gas pyrolyzing furnace 2. Hydrocarbon gases, such as, for example, natural gas, are introduced to furnace 2 at 11. If necessary, this gas may be preheated in any convenient manner. Since the temperature of the bed of oxide is maintained at about 1000° C., the gas will crack therein to deposit carbon in and on the oxide and to produce hydrogen. The gas, leaving furnace 2, at 12, may contain some free carbon, and if desirable, this carbon may be removed by some convenient device, such as, for example, the hot Cottrell precipitator shown as 13. The remaining gas, leaving at 14, may be utilized as fuel in the calcining furnace, together with other gaseous fuel, such as natural gas, if necessary, or may be recovered for other uses such as those mentioned hereinbefore.

The carbon-carrying lime passes from furnace 2 in a heated condition through 15 into and fills hopper 3a of the carbide furnace 3. Carbon separated at 13 may also be passed into 3a by pipe 18. In furnace 3, which, as shown here, is of the usual type, the lime and carbon are fused and heated by electrodes 16 and 17 to form calcium carbide in a molten state. Carbon monoxide liberated in 3, plus such carbon dust as may accompany it, is passed through pipe 19 to a separator and then to fuel use or other appropriate disposal. Molten calcium carbide is tapped off at 20.

In case the process is practiced for the local production of acetylene, the carbide formed in 3 and withdrawn at 20 is subsequently introduced into the usual hydrolyzer 21, together with water, thereby producing acetylene gas which is withdrawn at 22. The hydrate formed in 21 is withdrawn at 23 and after concentrating and drying, as in "nodulizing" kiln 24, may be returned to process as indicated by 25.

In Figure 2 is shown a variation of the operation, centering solely around the carbide furnace, which is applicable to our operations for manufacturing calcium carbide in the solid state from our lime-carbon complex. In this figure, 26 represents a shaft type furnace, heated by means of inductance coils 27 and susceptor 27a. The advantages incident upon the production of carbide in lump form, as shown in Figure 2, without the losses and inconvenience incident to a tapping furnace, as shown in Figure 1, are obvious.

Figure 3 is a further modification aimed at the production of lump carbide without intermediate melting. The furnace 28 of this embodiment is of the same nature as furnace 26 of Figure 2, except that in this case, furnace 28 is equipped with electrodes 29 and 30, and the heating is by direct resistance without fusion.

The economies of such a system as is shown here are obvious, since the carbide is produced directly from lime and natural gas, and the natural gas will supply, at a low cost level, both the heat for calcining and pyrolyzing, and also the electric power utilized in the carbide furnace; moreover, part of this electric power may be supplied by utilizing the off gases of the pyrolyzing and the carbide-forming furnaces. Thus, areas where cheap natural gas is plentiful are often close to suitable limestone deposits. As a result, low cost electric power from natural gas is available, and carbon from the natural gas is available. A very important factor also is that our process furnishes a constructive use for the enormous stores of natural gas which, unlike the valuable liquid hydrocarbons, are not being put to constructive use at this time.

In order to describe the invention still further, several illustrative operating examples are given below:

Example I

One hundred and fifty-six parts by weight of calcium oxide in the form of lumps of ¼" to ½" size were treated at 1000° C. during a period of 52 hours in which 563 parts by weight of pure methane were passed over the lime. The rate of flow was so adjusted as to give a contact time of 6 seconds. At the end of this run, the treated material was gray, with a bright metallic luster and had a mol ratio of 3:1, carbon to calcium oxide. No free carbon was evident. 32 parts of this lime-carbon complex were heated to a temperature of 1700° C. (approximate) in an induction furnace such as is shown in Figure 2, resulting in the production of 28 parts by weight of a material containing 20 per cent of calcium carbide.

Example II

Four hundred and fifty-seven parts by weight of calcium oxide were treated with 1,656 parts of methane under the temperature and contact time conditions of Example I for a period of 72 hours, yielding 784 parts of a similar gray lime-carbon complex with metallic luster having a mol ratio of 3:1, carbon to calcium oxide.

167 parts by weight of the complex were heated to 1800° C. for thirty minutes, yielding 130 parts of material containing 67 per cent of calcium carbide. The material treated retained its lump form throughout the process.

Example III 1920 parts by weight of calcium oxide in the form of ¼" to 1" lumps were treated at 1000° C. during a period of 40 hours during which 7000 parts by weight of methane were passed over the lime. The rate of flow was so adjusted as to give a contact time of 3.5 seconds. At the end of this run the treated material had the same physical properties as the complex described in Example 1, and a mol ratio 3.24:1, carbon to calcium oxide.

122 parts by weight of this complex were heated to 1800° C. for thirty minutes, yielding 90 parts of material containing 96 per cent of calcium carbide.

Example IV 423 parts by weight of calcium oxide were treated with 496 parts of methane at 1200° C. during a period of 8.5 hours, and with a contact time of 3 seconds. 767 parts of a gray lime-carbon complex were obtained having a mol ratio of 2.84:1, carbon to calcium oxide, and possessing the properties of the material described in Example I.

119 parts by weight of the material were heated to 1800° C. for thirty minutes, yielding 90 parts of material containing 67 per cent of calcium carbide.

In this example an appreciable amount of free carbon was also obtained during the pyrolysis step.

We claim:

1. The process of manufacturing calcium carbide which comprises pyrolyzing a light hydrocarbon gas in the presence of calcium oxide at a temperature between about 850 and about 1150° C. so as to produce a mixture of calcium oxide and carbon of proper proportions for manufacturing calcium carbide by heating, and then heating said mixture of calcium oxide and carbon at a temperature above about 1700° C. so that calcium carbide is formed.

2. The process of manufacturing calcium carbide which comprises pyrolyzing a methane-predominating gas in the presence of crushed calcium oxide at a temperature between about 850 and about 1150° C. so as to leave a deposit of carbon with the crushed material suitable for manufacturing calcium carbide, and then heating said crushed material with the deposited carbon at a temperature above about 1700° C. so that calcium carbide is formed.

3. The process of claim 2, wherein the pyrolyzing temperature is between about 950 and about 1050° C.

4. The process of claim 2, wherein the methane-predominating gas is a natural gas.

5. The process of manufacturing calcium carbide which comprises pyrolyzing a methane-predominating gas in the presence of crushed calcium oxide at a temperature between about 850 and about 1150° C. in a pyrolyzing zone while excluding appreciable amounts of extraneous gases from said zone thereby obtaining a mixture of calcium oxide and carbon of proper proportions for manufacturing calcium carbide by heating, and then heating said mixture of calcium oxide and carbon at a temperature above about 1700° C. so that calcium carbide is formed.

6. The process of manufacturing calcium carbide which comprises passing a moving bed of crushed calcium oxide through a pyrolyzing zone, introducing a methane-predominating gas into said zone while maintaining the zone at a temperature between about 850° and about 1150° C. by heating same without introducing extraneous gases thereinto, pyrolyzing said methane-predominating gas in said zone whereby the calcium oxide is transformed into non-dusting calcium oxide-carbon complexes which are substantially harder than calcium oxide, and which are of suitable proportions for manufacturing calcium carbide by heating, passing said complexes in heated condition substantially directly into a carbide-forming zone, passing said complexes through said carbide-forming zone in the form of a moving bed while heating the complexes to a carbide-forming temperature above about 1700° C. but below the melting points of the complexes and calcium carbide so that the calcium oxide-carbon complexes are converted in the solid state to calcium carbide.

7. The process of claim 6 wherein a sufficient amount of the calcium oxide-carbon complexes are recycled to the pyrolyzing zone that the moving bed therein is a conducting charge, and the zone is heated by means of electrical resistance.

8. The process of claim 6, wherein the carbide-forming zone is heated by means of electrical induction.

9. The process of claim 6, wherein the pyrolyzing zone is maintained at a temperature between about 950° and about 1050° C.

10. The process of manufacturing calcium oxide-carbon complexes that provide calcium oxide and carbon in efficient form for uses requiring these materials which comprises pyrolyzing a methane-predominating gas in the presence of crushed calcium oxide at a temperature between about 850° and about 1150° C. in a pyrolyzing zone, from which gases other than the hydrocarbon gas and gases produced in situ therefrom and from the calcium oxide are excluded.

11. The process of claim 10, wherein the crushed particles are between about ¼ and about 2 inches in size.

12. The process of manufacturing calcium oxide-carbon complexes that provide calcium oxide and carbon in efficient form for uses requiring these materials which comprises pyrolyzing a normally gaseous hydrocarbon in the presence of crushed calcium oxide at a temperature between about 850° and about 1150° C. in a pyrolyzing zone, from which gases other than the hydrocarbon gas and gases produced in situ are excluded whereby non-dusting calcium oxide-carbon complexes are formed which are substantially harder than calcium oxide and which are electrical conductors.

13. A process which comprises pyrolyzing a methane-predominating gas in the presence of calcium oxide at a temperature between about 850° C. and about 1400° C. in a pyrolyzing zone while excluding gases other than the methane-predominating gas and gases produced in situ, and correlating the residence time of the calcium oxide in the pyrolyzing zone with the temperature so that the calcium oxide consists essentially of particles impregnated with carbon in a mol ratio of at least 1 to 1.

14. A process which comprises pyrolyzing a normally gaseous hydrocarbon in the presence of calcium oxide at a temperature between about 850° C. and about 1400° C. in a pyrolyzing zone while excluding gases other than the hydrocarbon gas and gases produced in situ, and correlating the residence time of the calcium oxide in the pyrolyzing zone with the temperature so that the calcium oxide consists essentially of particles impregnated with carbon in a mol ratio of at least 1 to 1.

15. A process which comprises pyrolyzing a methane-predominating gas in the presence of calcium oxide particles at a temperature between about 850° C. and about 1400° C. in a pyrolyzing zone while excluding gases other than the methane-predominating gas and gases produced in situ, and correlating the residence time of the calcium oxide in the pyrolyzing zone with the temperature so that the major portion of the calcium oxide particles are impregnated with carbon in a mol ratio of from 1 to 1 to 4 to 1.

16. A continuous process for the production of carbon impregnated calcium oxide particles which comprises continuously introducing calcium oxide particles into a pyrolyzing zone, continuously passing upwardly through said calcium oxide particles a normally gaseous hydrocarbon while maintaining a temperature of between about 850° C. and 1400° C. and excluding gases other than said hydrocarbon and gases produced in situ, continuously withdrawing calcium oxide particles after a residence time sufficient so that the major portion of the particles are impregnated with carbon in a mol ratio of from 1 to 1 to 4 to 1.

ARMAND J. ABRAMS.
LOUIS B. COOK.